US010095720B2

(12) United States Patent
Mano et al.

(10) Patent No.: US 10,095,720 B2
(45) Date of Patent: Oct. 9, 2018

(54) DATABASE TABLE INDEX

(71) Applicant: Amadeus S.A.S., Biot (FR)

(72) Inventors: Enrico Mano, Antibes (FR); Jose Morales Aragon, Nice (FR); Marcos Rodriguez Palacios, Peymeinade (FR); Didier Spezia, Nice (FR)

(73) Assignee: AMADEUS S.A.S., Biot (FR)

( * ) Notice: Subject to any disclaimer, the term of this patent is extended or adjusted under 35 U.S.C. 154(b) by 372 days.

(21) Appl. No.: 15/017,102

(22) Filed: Feb. 5, 2016

(65) Prior Publication Data

US 2017/0228407 A1    Aug. 10, 2017

(51) Int. Cl.
*G06F 17/30* (2006.01)
*G06F 7/00* (2006.01)

(52) U.S. Cl.
CPC .. *G06F 17/30324* (2013.01); *G06F 17/30315* (2013.01); *G06F 17/30333* (2013.01)

(58) Field of Classification Search
CPC ......... G06F 17/30324; G06F 17/30333; G06F 17/30315
USPC ....................................................... 707/745
See application file for complete search history.

(56) References Cited

U.S. PATENT DOCUMENTS

| | | | | |
|---|---|---|---|---|
| 5,956,721 | A * | 9/1999 | Douceur | H04L 29/06 |
| 6,289,013 | B1 * | 9/2001 | Lakshman | H04L 49/602 370/389 |
| 2002/0138464 | A1 * | 9/2002 | Calascibetta | G06F 17/30324 |
| 2003/0120622 | A1 * | 6/2003 | Nurmela | H04L 63/0227 706/47 |
| 2003/0174703 | A1 * | 9/2003 | Relan | H04L 45/742 370/392 |
| 2004/0057432 | A1 * | 3/2004 | Allen | H04L 12/4135 370/392 |
| 2005/0135351 | A1 * | 6/2005 | Parmar | H04L 45/742 370/389 |
| 2005/0154757 | A1 * | 7/2005 | Barsness | G06F 17/30702 |
| 2005/0226235 | A1 * | 10/2005 | Kumar | H04L 29/06 370/386 |
| 2008/0215556 | A1 * | 9/2008 | Surna | G06F 17/30424 |
| 2008/0232359 | A1 * | 9/2008 | Kim | H04L 63/0236 370/389 |
| 2008/0279185 | A1 * | 11/2008 | Zhang | H04L 45/00 370/392 |
| 2011/0270871 | A1 * | 11/2011 | He | G06F 17/30324 707/769 |

(Continued)

*Primary Examiner* — David T. Brooks
(74) *Attorney, Agent, or Firm* — Thompson Hine LLP

(57) ABSTRACT

Methods and systems for determining one most specific row within a database table. An index includes an index structure for each column of the database table. Each index structure includes an array of pointer tuples for each value occurring in the column and a bitmap indicating cells without values. A first pointer of the tuple indicates a value and a second pointer indicates the row of the database table with the value. The index also indicates an order of specificity of the rows of the database table. A computer system processes a request by using the bitmaps of the index structures to maintain all rows of the database table without values and the pointer tuples to filter all rows of the database table that do not include the respective input value. The one row being highest in the order of specificity from the remaining rows is selected and returned.

29 Claims, 13 Drawing Sheets

(56) References Cited

U.S. PATENT DOCUMENTS

| | | | |
|---|---|---|---|
| 2014/0095782 A1* | 4/2014 | Koktan | H04L 45/60 |
| | | | 711/108 |
| 2014/0180995 A1* | 6/2014 | Ziegler | G06N 5/025 |
| | | | 706/47 |
| 2014/0208016 A1* | 7/2014 | Malik | G11C 15/04 |
| | | | 711/108 |

* cited by examiner

| | | | |
|---|---|---|---|
| 0.0.0.0 | 0.0.0.0 | 192.168.1.1 | 192.168.1.2 | 3 |
| 127.0.0.0 | 255.0.0.0 | 127.0.0.1 | 172.0.0.1 | 1 |
| 192.168.0.0 | 255.255.255.0 | 192.168.1.1 | 192.168.1.2 | 2 |
| 192.168.1.0 | 255.255.255.0 | 192.168.1.2 | 192.168.1.2 | 1 |
| 192.168.2.0 | 255.255.255.0 | 192.168.2.1 | 192.168.2.1 | 1 |

DATABASE TABLE INDEX

TECHNICAL FIELD

The present invention generally relates to database technology and, more particularly, to systems, methods, and computer program products implementing an index for accessing a database table in response to a request and to determine the most specific data record (row) of the database table complying with the request.

BACKGROUND

Database tables may be indexed in order to access data records in a direct or accelerated manner. An index is a meta-data structure that improves the speed of data retrieval operations on a database table, at the cost of storage space to maintain the index data structure. Indexes are used to quickly locate data without having to search every row in the database table every time the database table is accessed. Indexes can be created using one or more columns of the database table, which provide the basis for both rapid random lookups and efficient access of ordered records.

A particular task in various database-related applications is to retrieve only the row of the database table that is the most specific row fulfilling a retrieval request. Hence, in response to the retrieval request, the database application determines the one row of the database table which corresponds to input parameters or criteria in the most specific manner. To this end, a hierarchy of specificity among the rows is generally present in the database table.

A known approach to determine one most specific row within a database table uses the Rete algorithm. The Rete algorithm is a pattern matching algorithm that is used e.g., for implementing production rule systems (e.g., automated planning, expert systems and action selection systems). It is used in order to determine all rules which match the input criteria. Afterwards, a so-called "conflict resolution" is performed which uses an order among the determined rules to identify the one rule which is to be returned.

Improved systems, methods, and computer program products for accessing a database table are needed.

SUMMARY

In an embodiment, a method is provided for determining one most specific row within a database table. The database table is maintained by a computer system. The database table is formed by a plurality of rows and a plurality of columns. The rows and columns of the database table form cells. Each of the cells either includes at least one value or no value. The computer system also maintains an index for the database table.

The index includes a respective index structure for each column of the database table. Each index structure includes two types of sub-structures, namely a respective array of pointer tuples for each value occurring in the respective column and a bitmap relating to the cell of the column without values. Each pointer tuple includes a first pointer indicating one of the values occurring in the column and a second pointer indicating the row of the database table in which the value occurs. The bitmap indicates all cells within the respective column without a value. The index also indicates an order of specificity of the rows of the database table.

The computer system receives a request indicating columns of the database table associated with a respective input value. The computer system then processes the request in an incremental manner for each column indicated in the request. For each column, the computer system uses the bitmap of the index structure for the column to maintain all rows of the database table which do not contain values in the cell of the column considered. Furthermore, for each column, the computer system uses the pointer tuples of the index structure for the column to filter all rows of the database table which do not include the respective input value. After all columns with the respective input values of the request have been processed, the computer system selects the one row being highest in the order of specificity from the remaining rows, i.e., the rows that have not been filtered during the incremental processing of the columns. Finally, the computer system returns the value of at least one cell of the determined row.

According to another aspect, a computer system arranged to perform a respective method of determining one most specific row within a database table is provided.

According to still another aspect, a computer program for instructing a computer system to perform the method of determining one most specific row within a database table is provided.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. Similar reference numbers generally indicate identical or functionally similar elements.

FIG. 12 shows a routing table as an example of a database table.

DETAILED DESCRIPTION

The index described herein facilitates access to a database table which is maintained by a database system. The term database as used herein encompasses all sorts of data repositories keeping static or dynamic data in form of tables. These sorts of data repositories include, for example, relational database systems such as Oracle databases, Microsoft SQL Server, Microsoft Access, object-relational database system such as PostgreSQL, production rule systems such as expert systems and action selection systems engines (e.g., expert systems maintaining repair and maintenance actions for technical devices), network and control elements such as routers (with routing tables), network management nodes (with log and/or control data maintained in tables) or SCADA systems (also maintaining log and/or control data in form of tables), as well as proprietary systems keeping data e.g., in simple tables such as Microsoft Excel spreadsheets or tabulator text files (e.g., csv files).

In general, the database is implemented on a computer system, such as a database server or a network node. The database is arranged to receive retrieval requests (hereinafter simply called "requests") specifying search criteria (hereinafter called "input values"), to process a request by checking the input values against the at least one database table, to determine a data record of the database table which fulfils the input values, and to return one or more values of this data record. To this end, the database uses any type of database language and is equipped with any type of communication interface known in the art. The originator of the request e.g., a client (computer, mobile station, application, etc.) in a local area network (LAN) or in a remote network querying the database 1.

Figure 1:
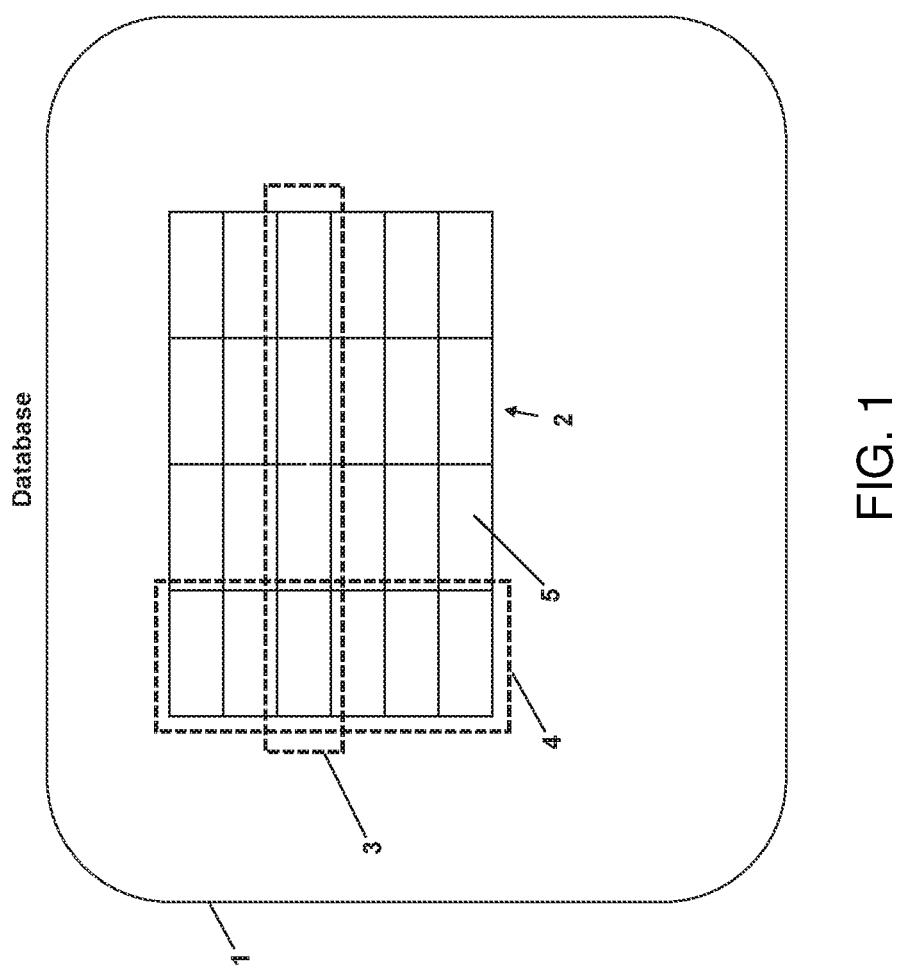
FIG. 1 illustrates a database with a database table.

As illustrated by FIG. 1, a database 1 maintains at least one database table 2. The database table 2 is built of a number of rows 3 and a number of columns 4. Each row 3 of the database table includes a data record and each column 4 of the database table constitutes an attribute of the data records, generally in accordance with a data model (such as a relational database management model). The combination of the rows 3 and the columns 4 forms cells 5. Generally, any number of rows 3 and columns 4 may be present in the database table 2. As data records may be added or deleted, in particular the number of rows 3 is not fixed, but may change over time. The database 2 may also include mechanisms to redefine or alter the data model, i.e., also the number of columns can be adapted as well.

Figure 2:
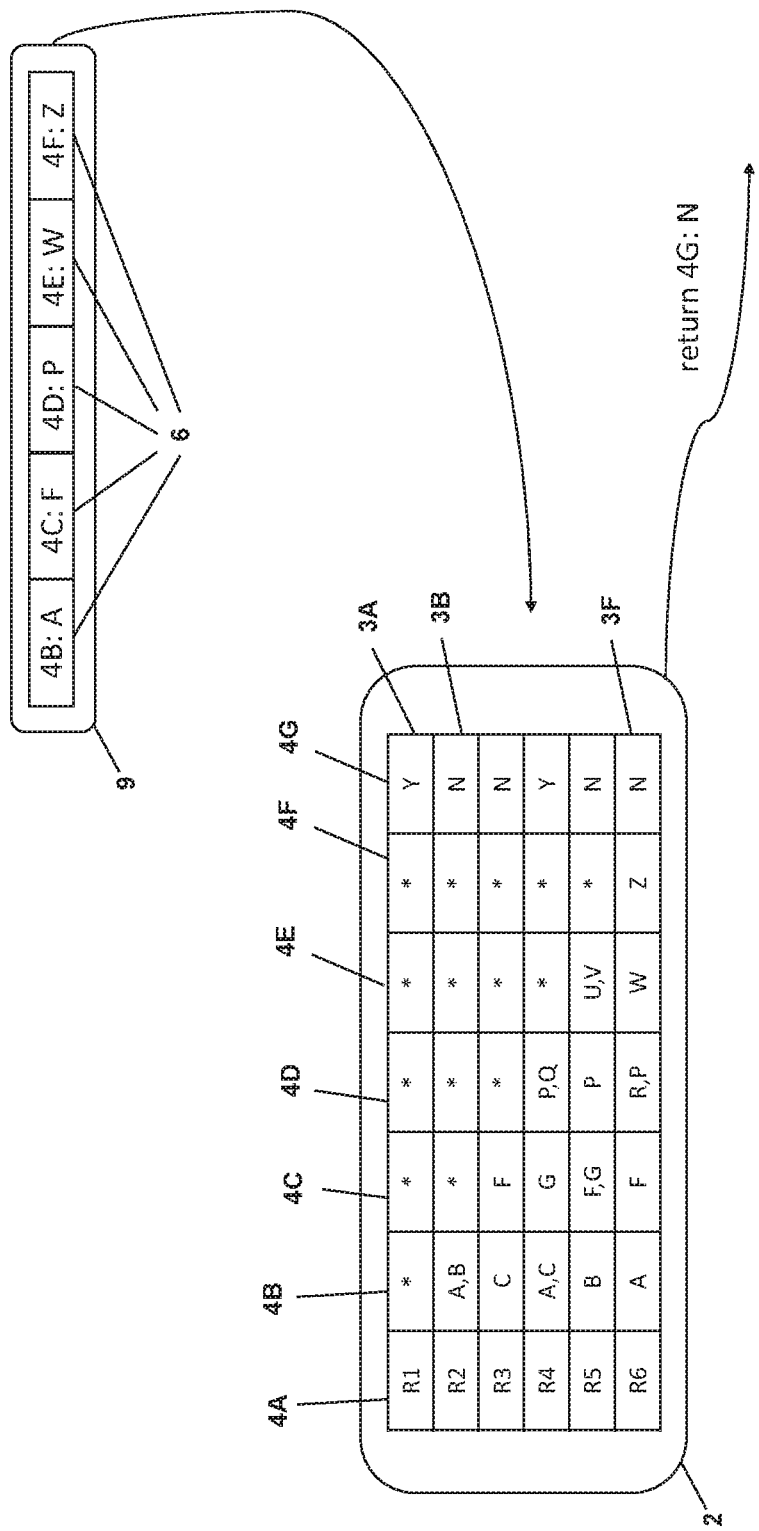
FIG. 2 is a generic example of a database table and a request.

The cells 5 of the database table either contain at least one value or no value (FIG. 2). The values in the cells are generally in accordance with a data type defined for the respective column, as prescribed by the data model. Data types include, for example, Boolean (i.e., values are "true" and "false"), integers, floating-point numbers, characters, strings, pointers, as well as complex, functional data types such as dates. More than one value may be present in a cell 5, i.e., a cell 5 may include a vector or list of values, e.g., in form of an array, record, set, enumeration or object of values according to a data type.

Cells 5 without values may include wildcards such as NULL or *. These wildcards specify the absence of a value, i.e., a respective cell is considered to include any value of the value range permissible for the data type of the corresponding columns as prescribed the data model. An example of a data record using wildcards is the standard route in an IP routing table using the network address "0.0.0.0" in the destination address columns and subnet mask "0.0.0.0" in the subnet mask columns as a wildcard for any possible destination IP address (cf. routing table example of FIG. 12).

FIG. 2 shows a generic example of a database table 2 with six rows 3 (i.e., six data records) and seven columns 4 (i.e., the data records have seven attributes). The columns of this exemplary database table define any type of attributes for the data records held by the rows. The first column 4A defines a key attribute of the data records. The first row 3A defines, for example, a default data record with wildcards "*" in the columns 4B to 4F and a "yes" in the last column 4G being of Boolean data type. Hence, the first row 3A specifies "yes" as a default response. The further rows define more specific data records. For example, the second row 3B specifies a tuple of values "A, B" as the attribute in the second column 4B and "no" as the last attribute of the data record, while all other cells contain wildcards (neglecting the key column 4A), i.e., any values for these attributes fall within the data record of row 3B. For example, data model may define values F, G, H, I, J and K as the permissible data range for the third column 4C. Hence, the wildcard in the third cell of the second data record (row 3B, column 4C) stands for all possible values F, G, H, I, J and K of this attribute of the second data record.

The database table 2 is generally stored in a memory of the computer system, for example in main memory (RAM).

As set forth at the outset, the database table index described herein is particularly arranged to allow a determination of the most specific row corresponding to a request. In general, rows containing more wildcards (i.e., more non-values, less cells with values) than other rows are considered to be more unspecific than rows including less wildcards (i.e., less non-values, more cells with values). In other words, rows including more general data records are defined to be more unspecific than rows with more definite content, the latter one are defined to be more specific. To facilitate the determination of the most specific row that matches the input values of a request, an order of specificity among the rows of the database table 2 is either given or established. Optionally, the order of specificity is implicit in the sorting of the row. For example, the rows are sorted within the table from unspecific to very specific, as in the example of the database table shown in FIG. 2. In some embodiments, the order of specificity is explicitly defined, e.g., by a specificity column indicating the respective level of specificity of the rows, such as the key values in the key column 4A of the database table 2 in FIG. 2. Optionally, the order of specificity strictly monotonous, i.e., each row of the database table has a unique order of specificity. In other examples, classes of specificities are defined, and multiple rows can share a common level of specificity. In the latter examples, a mechanism is present to ensure that only one row of the multiple rows being member of the same specificity level fulfils the input values in the request, e.g., rows define mutually exclusive data records and values for a minimum number of rows of the database table are indicated in the request.

In response to receiving a request indicating at least columns and respective input values, the database 1 processes the request with the input values included in the request and compares the input values with the database table 2 in order to determine the most specific row fulfilling the input values. Referring back to FIG. 2, a generic exemplary request 9 is received. In the example of FIG. 2, the order of specificity is explicitly defined by column 4A sorting of the rows according to the key values, whereas row 3A is the most unspecific row (as it contains five wildcards and only one value in column 4G), and row 3F is the most specific value (as it does not contain any wildcard, but only cells with values). In the example of FIG. 2, the request 9 indicates the five columns 4B, 4C, 4D, 4E and 4F and respective input values. The database 1 determines the last row 3F to be the most specific row corresponding to the request 9, as value "A" in the cell 4B/3F matches the input value A for column 4B, the value "F" in the cell 4C/3F matches the input value F for column 4C, the values "P, R"

in the cell 4D/3F match the input value P for column 4D, the value "W" in the cell 4E/3F matches the input value W for column 4E and the value "Z" in the cell 4F/3F matches the input value Z for column 4F. The two other rows 3A and 3B which also correspond with the input values 6 of request 9 are less specific than row 3F as they are ranked lower in the implicitly defined order specificity of database table 2.

After the most specific row 3 is determined, at least one value (attribute) of the most specific row is returned. In the example of FIG. 2, the value of column 4G of row 3F is returned, i.e., Boolean value "no".

Figure 3:
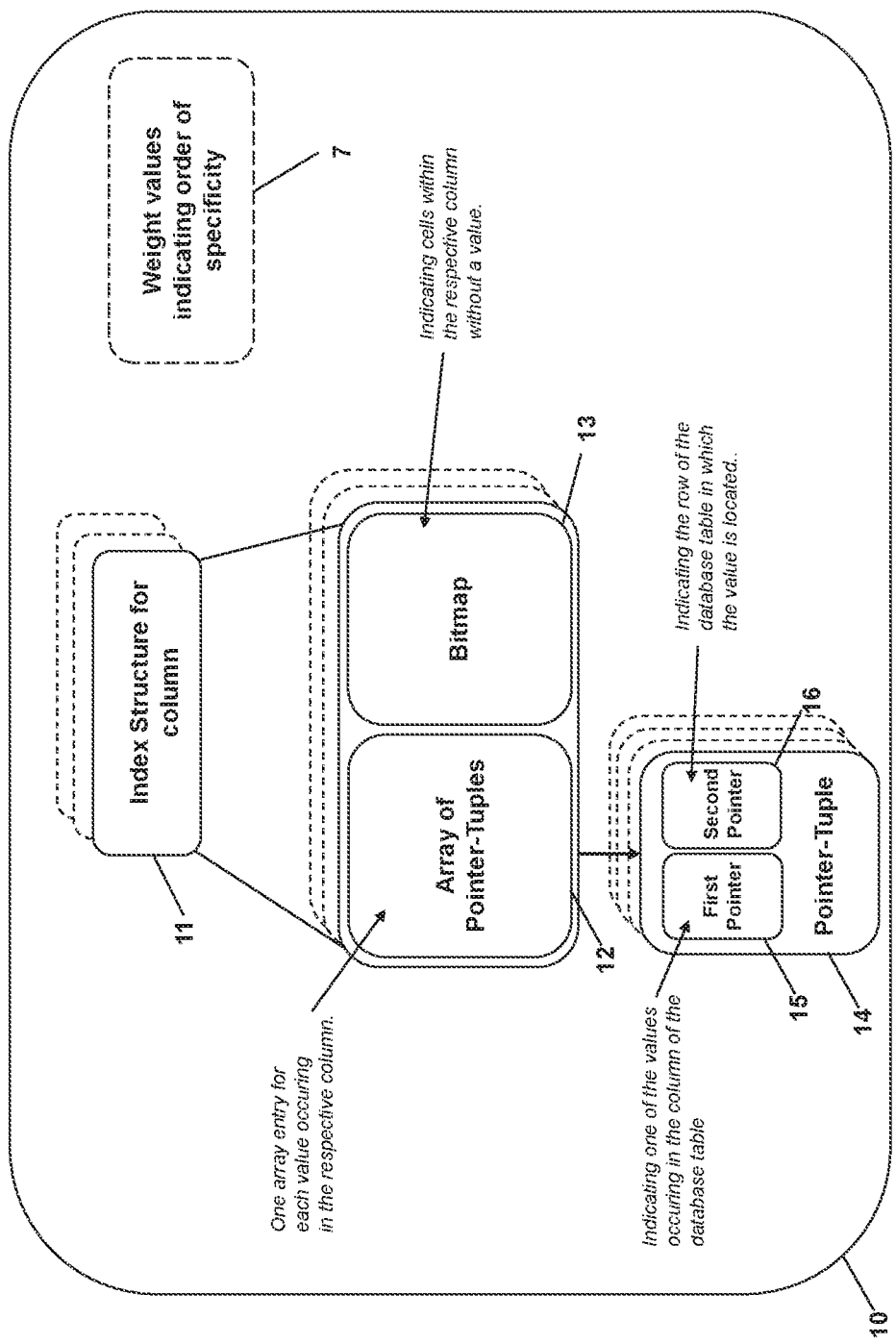
FIG. 3 illustrates the structure of an index as described herein.

Determination of the most specific row corresponding with a request utilizes the index 10 described herein (FIG. 3). The index for the database table 2 includes an index structure 11 that is provided for each column 4 of the database table for which input values in a request are expected. The index structure 11 is therefore also referred to as column-specific index structure hereinafter. Each column-specific index structure 11 includes two elements, namely, an array of pointer tuples 12 and a bitmap 13 (the bitmap is a collection of contiguous bits, i.e., a bit array).

The array of pointer tuples 12 has the function to refer to all the values in the cells of the column of column referred to by the respective column-specific index structure 11. Each pointer tuple 14 in the array 12 includes a first pointer 15 and a second pointer 16. The first pointer 15 references one of the values included in the column. The value is stored at some particular location in the memory of the computer system hosting the database 1. The first pointer references this memory location. The second pointer 16 indicates the row of the database table 2 in which the value occurs. For example, the row is identified by a key value which is again stored at a particular memory location in the memory of the computer system hosting the database 1. The second pointer references this memory location. Thus, the number of pointer tuples 14 included in the array 12 corresponds to the number of values occurring in the column referred to by the respective column-specific index structure 11.

The bitmap 13 specifies those cells in the column referred to by the respective column-specific index structure 11 which do not have values, i.e., which include wildcards. The bitmap 13 is therefore also called "non-value bitmap". The number of bits in the non-value bitmap 13 corresponds to the number of rows 3 of the database table 2.

Figure 4:
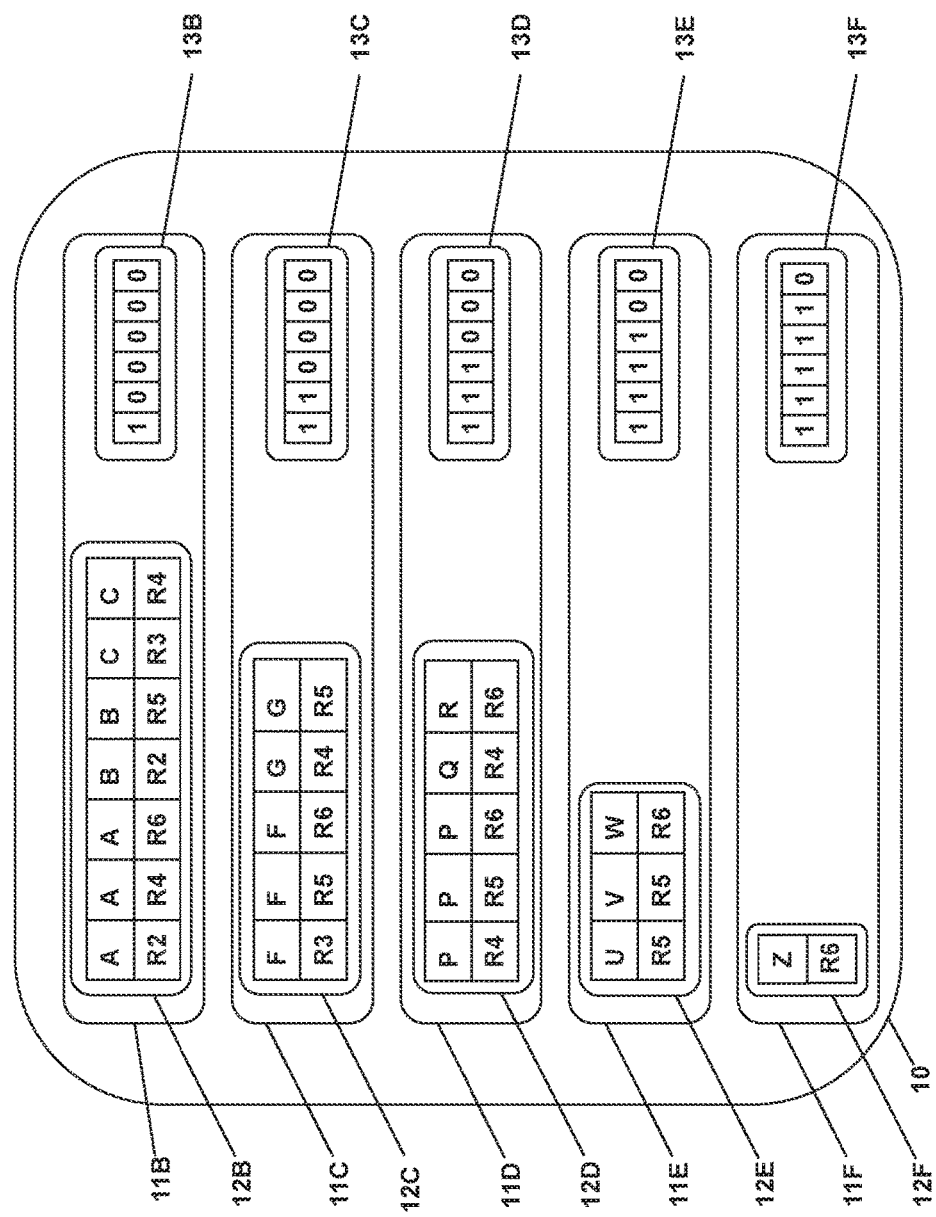
FIG. 4 illustrates a generic example of an index for the database table of FIG. 2.

An example of an index 10 is illustrated by FIG. 4. The exemplary index shown by FIG. 4 relates to the generic database table example of FIG. 2. The index 10 shown by FIG. 4 is composed of five index structures 11 corresponding to the columns 4B to 4F of the database table 2 of FIG. 2 for which input values 6 are expected (column 4G with the Boolean data type cannot be requested in the example of FIG. 2—the values of this column are return values). Each of the index structures 11 contains an array of pointer tuples 12 and the no-value bitmap 13.

The array of pointer tuples 12 within each of the column-specific index structure 11 constitutes a compact list of all values included in the respective column of the database table 2. For example, array 12B within index structure 11B lists the presence of all the values A, B and C occurring in column 4B. Value A occurs in the rows with key values R2, R4 and R6, value B is present in the rows with key values R2, and R5, and value C is present in the rows with key values R3 and R4 (cf. FIG. 2). As mentioned above, the first pointers in the pointer tuples reference the respective memory address of the values A, B and C in the computer's memory, whereas the second pointers in the pointer tuples indicate the corresponding row, i.e., reference the row key values in this example. The same is true for the other arrays 12C to 12F in the index structures 11C to 11F.

Optionally, the pointer tuples 14 in the arrays 12 are sorted by the value referenced by the first pointers. In FIG. 4, for example, the pointer tuples in array 12B are sorted by the values A, B and C occurring the column 4B. Hence, the first three pointer tuples in array 12B define the occurrence of value A in column 4B, the next two pointer tuples define the occurrence of value B in column 4B and the two last pointer tuples define the occurrence of values C in column 4B. Sorting the pointer tuples 14 within the array 12 facilitates efficient memory access when utilizing the index 10, e.g., for performing a linear search over the pointer tuples 14 because the respective values only need to be loaded once from the memory when processing the first pointer tuple defining the occurrences of a value and are then available, e.g., in the processor cache for the subsequent pointer tuples still relating to the same value. Sorting the pointer tuples 14 also facilitates a binary search over the pointer tuples which is used in some embodiments (explained further below with reference to FIG. 8).

The bitmaps 13 provide a compact representation of the occurrence of the cell without values in the database table 2. Each bitmap 13 includes six bits, coinciding with the number of rows 3 in the database table 2 in the example of FIG. 2. By definition, the sequence of the bits in the respective bitmaps corresponds to the sequence of rows with key values R1 to R6, i.e., the first bit in each of the bitmaps 13 refers to the row with key value R1, the second bit in each of the bitmaps refers to row with key value R2, and so on, and the last bit in each of the bitmaps 13 refers to the last row with key value R6. In the example of FIG. 4, bits set to the '1' denote all rows in the respective column without values (i.e., with wildcards), whereas bits set to '0' denote rows in the respective column with values (i.e., no wildcards). For example, bitmap 13B indicates that only the first row (key value R1) in column 4B does not include a value, while the other rows (key values R2 to R6) include values. The same applies to the other bitmaps 13C to 13F in an analogous manner for the no-value cells in columns 4C to 4F.

The index 10 as described above represents a particularly compact meta-data structure (when compared to currently known state-of-the-art indexes). The location of cells without values are not stored as pointer tuples 14, but in form of the bitmaps 13 which decreases the number of pointer tuples 14. The size of one pointer tuple 14 is always a power of 2. For example, a pointer has the size of 8 Bytes in a modern 64 bit memory architecture, amounting to the size of 16 bytes for one pointer tuple 14. As integer multiplication for number of power-of-2-size is more efficient than for numbers of non-power-of-2 sizes, random accesses in the index 10 is efficient. For certain classes of database tables (e.g., tables with 1000 entries or less), the index 10 will fit into L1 and/or L2 CPU caches and thus can be made permanently available in a very-fast-access memory and thus overall improved performance of the request processing and row determination. Furthermore, the index 10 facilitates a binary search algorithm for determining the most specific row, as will be described further below (with references to FIG. 8).

The index 10 also indicates the order of specificity of the rows 3 of the database table 2. Various way are envisaged for this indication. For example, as mentioned above with reference to FIG. 2, the database table 2 itself is already sorted in accordance with its order of specificity e.g., from lowest to highest specificity (cf. also activity 38 in FIG. 9 and activity 17 in FIG. 10). In such embodiments, the order of specificity of the database table rows is implicitly present in the index 10 within the no-value bitmaps 13. As explained above, the no-value bitmaps 13 include a bit for each row 3 of the database table 2 and the order of the bits in the bitmaps 13 corresponds to the order of the rows 3 of the database table 2. Thus, the respective first bit in the bitmaps 13 refers to the first row (e.g., row 3A in FIG. 2) which is e.g., the least specific row and the respective last bit in the no-value bitmaps 13 refers to the last row (e.g., row 3F in FIG. 2) which is e.g., the most specific row of the database table 2. In other embodiments, the rows of the database table 2 are not sorted by specificity, but the index 10 includes a separate data structure defining the order of specificity of the rows 3. For example, weight values 7 (see FIG. 3) are associated with the rows 3 when generating the index 10 (see also activity 44 in FIG. 9) and are explicitly maintained as meta-data defining the order of specificity of the rows 3 within the index 7.

In response to receiving a request 9, the computer system hosting the database 1 utilizes the index 10 to determine the most specific row as follows. In general, an incremental process is performed which processes the request column-wise, for each column (and respective input value 6) indicated in the request 9.

Starting with the first column 4 indicated in the request 9 (column 4B with input value "A" in the example of FIG. 2), the computer system uses the bitmap 13 of the index structure 11 for the first column (index structure 11B with bitmap 13B in the example of FIG. 2) to ensure that all rows 3 of the database table 2 that do not contain a value are not discarded because these row include wildcards which encompass any input values. Hence, in the example of FIGS. 2 and 4, row R1 (indicated by the '1' in the bitmap 13B) is definitely maintained. At this point, no decision is taken as regards maintaining or discarding the other rows marked with a '0' in the bitmap 13B.

Next, in addition to maintaining the rows according to the no-value-bitmap utilization, the pointer tuples 14 of the index structure 11 for the first column (index structure 11B with array of pointer tuples 12B in the example of FIG. 2) are utilized to maintain all rows 3 which include the respective input value (input value "A" in the example of FIG. 2) and to filter out all rows 3 of the database table 1 which do not include the input value 6. In the example of FIGS. 2 and 4, all rows which include the value "A" (namely rows R2, R4 and R6) are maintained, while the remaining rows that do not contain the input value "A" in column 4B (rows R3 and R5) are discarded.

Book-keeping the maintaining and discarding decisions throughout this incremental process is, in some embodiments, based on additional temporary bitmaps (referred to as result bitmaps, described in detail further below) indicating the rows which are still maintained and the rows which are already discarded.

This process is repeated for every column 4 indicated in the request 9. At every iteration, none, one or more rows 3 of the database table 2 are discarded. After all columns 4 indicated in the request 9 have been processed, one or more rows 3 complying with the input values indicated in the request remain. The computer system then selects, by utilizing the index 10, the one row 3 from the remaining rows which is the highest in the order of specificity. In the example of FIGS. 2 and 4, the rows 3A, 3B and 3F (i.e., rows with key values R1, R2 and R6) fulfil the input values 6 of the exemplary request 9 shown in FIG. 2. The most specific row is row 3F (key value R6). In the example of FIGS. 2 and 4, the order of specificity is given by the sorting of the rows that is also reflected in the index 10 (in the bitmaps 13, as well as in the result bitmaps described below). Thus, in the example of FIGS. 2 and 4, the computer system picks the remaining row with the highest key value (which is located most right in the bitmaps 13 and in the result bitmap described below).

Next, an implementation example of the incremental request processing and row determination process is described with reference to FIG. 5. This example again re-uses the exemplary database table 2 of FIG. 2 and the corresponding index 10 as shown in FIG. 4, the latter one being depicted on the left-hand side of FIG. 5. Generally, the request processing example is based on two additional bitmaps to utilize the pointer tuples 14 and the no-value bitmaps, namely a column bitmap 23 and a result bitmap 25. Both, the column bitmap 23 and the result bitmap 25 include a number of bits which corresponds the number of rows in the database table 2. The purpose of the column bitmap 23 is to indicate, during each iteration through the columns 4 and corresponding input value 6 indicated in the request 9, those rows 3 of the database table 2 which include the respective input value. The purpose of the result bitmap 25 is to indicate, throughout the incremental request processing, the remaining rows 3 of the database table which are still candidate rows that potentially fulfil all the input values 6 included in the request 9 and, at the same time, to indicate all rows 3 of the database table 2 which have been filtered out because they do not correspond with one or more of the input values 6.

The request processing starts with initializing the result bitmap 25, e.g., setting all bits of the result bitmap 25 to '1', whereas each '1' indicates that the row 3 associated with the respective bit in the result bitmap 25 has not yet been filtered out, i.e., is still a candidate row that potentially fulfils all the input values 6 included in the request 9. Hence, at the beginning of the request processing, all rows 3 of the database table 2 are valid candidates.

Next, the first iteration concerning the first column and respective input value 6 (in the example of FIGS. 2 and 4: column 4B with input value 6B="A") is passed through which is formed by two activities utilizing the respective index structure (here: index structure 11B). The first activity concerns the determination which rows 3 of the database table 2 fulfil the current input value 6B. The second activity concerns the book-keeping of the remaining candidate rows maintained throughout all iterations.

As regards the first activity, the column bitmap 23B is initialized with the bit values of the no-value bitmap 13 of the column 4 considered during the current iteration (here: column 4B, no-value bitmap 13B). Thus, in the example, the column bitmap 23B is set to 1-0-0-0-0-0 and therefore indicates that the row 3A (key value R1) is definitely to be maintained (because it includes a wildcard in column 4B). Next, the array of pointer tuples 12B is searched through for all rows including the input value "A". In some embodiments, this search is a binary search (explained further below with reference to FIG. 8). On other embodiments, this search is a linear search. In the example, the search in the array of pointer tuples 12B yields that rows with key values R2, R4 and R6 include an "A" in the currently considered column 4B. Consequently, the bits in the column bitmap 23B corresponding to the rows which have been determined to include the input value 6B are also set to '1', as they fulfil the first input value 6B and are therefore to be maintained. Hence, in the example, the second, fourth and sixth bit of the column bitmap 23B are set to '1', the column bitmap 23B now being set to 1-1-0-1-0-1, meaning that the first, second, fourth and sixth row (key values R1, R2, R4 and R6) are still candidate rows, while the third and fifth row (key values R3 and R5) are filtered out. At this point, the column bitmap 23B indicates, for the current iteration, all rows which fulfil the first input value 6B included in the request 9.

As regards the second activity, the established column bitmap 23B is combined with the current version of the result bitmap 25 in order to include the row determination result of the current iteration into the overall book-keeping of the candidate rows. In the example, all remaining candidate rows are indicated by bits set to '1', while all filtered rows are indicated by bits set to '0'. Hence, a logical bit-wise AND-operation is performed between the column bitmap 23B and the current version of the result bitmap 25, resulting in an updated version 25B of the result bitmap. In the example, the updated version 25B of the result bitmap is thus set to 1-1-0-1-0-1.

This concludes the first iteration concerning the first column indicated in the request 9 and corresponding input value 6. Subsequent iterations are performed in the same manner. Again, during each of the following iterations, the column bitmap 23 is re-initialized with the bit values of the respective no-value bitmaps (in the example, the no-value bitmaps 13C to 13F, initializing versions 23C to 23F of the column bitmaps). Then, the respective array of pointer tuples (in the example, arrays 12C to 12F) are searched for occurrences of the respective input values included in the request 9 (in the example, input values 6C to 6F). Respective bits corresponding to rows including the respective input value 6 are set to '1' in the column bitmap 23. The respective resulting version 23C-23F of the column bitmap is combined with the respective current version 25C-25F of the result bitmap by the bit-wise AND-operation.

In the example, the final version of the result bitmap 25F indicates that the first row, second row and sixth row fulfil all input values 6 included in the request 9. The last activity of the request processing concerns the selection of the most specific row among the remaining rows after the iterations have been concluded. To this end, the indication of the order of specificity within the index 10 is utilized. In the example, the order of specificity is given by the sorting of the rows 3 of the database table 2 which is reflected in the sequence of the bits (corresponding to the rows) in the no-value bitmaps 13, in the column bitmap 23 and in the result bitmap 25. Thus, in the example, the most specific row among the remaining candidate rows is given by the right-most '1' (reference numeral 27) in the final version 25F of the result bitmap.

Although this request processing involves a number of operations having a complexity of O(n), it has several advantageous technical characteristics. Only a limited amount of memory space is needed for performing the operations. The two additional bitmaps, the column bitmap 23 and the result bitmap 25 include a number of bits corresponding to the number of rows of the database table 2. Hence, for a database table with e.g., 1024 rows, the columns bitmap 23 and the result bitmap 25 have a size of 128 Bytes each. In addition, the request processing is deterministic because the number of database column iterations is predetermined by the number of columns of the database table and columns indicated in the request, respectively. Hence, for database tables with certain numbers of rows, the response time of each request processing is deterministic.

Furthermore, the number of lookup operations and value comparison operations (comparing input values with values referenced by the respective first pointers 15) for searching the arrays of pointer tuples 12 for the presence of input values 6 is reduced in favour of bitmap operations (such as the logical bit-wise AND operations). Although bitmap operations involve O(n) operations, n is relatively small (corresponding to the number of rows 3), and the bitmap operation generally fully exploit the capabilities of modern computer hardware. For example, individual assembler instructions of 64-bit architectures process 64 bits at once. Furthermore, the present request processing is specifically adapted to CPUs being equipped with OOO (out-of-order) computing units which have the capability to perform several computations per clock cycle on a single core, provided there is no dependency between those computations. The latter condition applies to the bitmap operations which because each of the individual AND operation per bit within an overall AND operation between column bitmap 23 and result bitmap 25 are independent from each other.

Reducing the portion of search and lookup operations for the benefit of an increased portion of bitmap operations also specifically addresses a vector extension arrangement of CPUs, in particular of CPUs being equipped with an SSE2 (Streaming SIMD Extensions, SIMD=Single instruction, multiple data) instruction set offers the capability to process 128 bits in one assembler instruction, an AVX2 (Advanced Vector Extensions) instruction set to process 256 bits in one assembler instruction or AVX-512 (e.g., Intel's "Knights Landing" generation) enabling 512 bits processing in one assembler instructions. For example, with the latter instruction set, a bit-wise AND operation between the column bitmap 23 and the result bitmap 25 for a database table 2 with 1000 rows can be performed within two CPU cycles.

Figure 6:
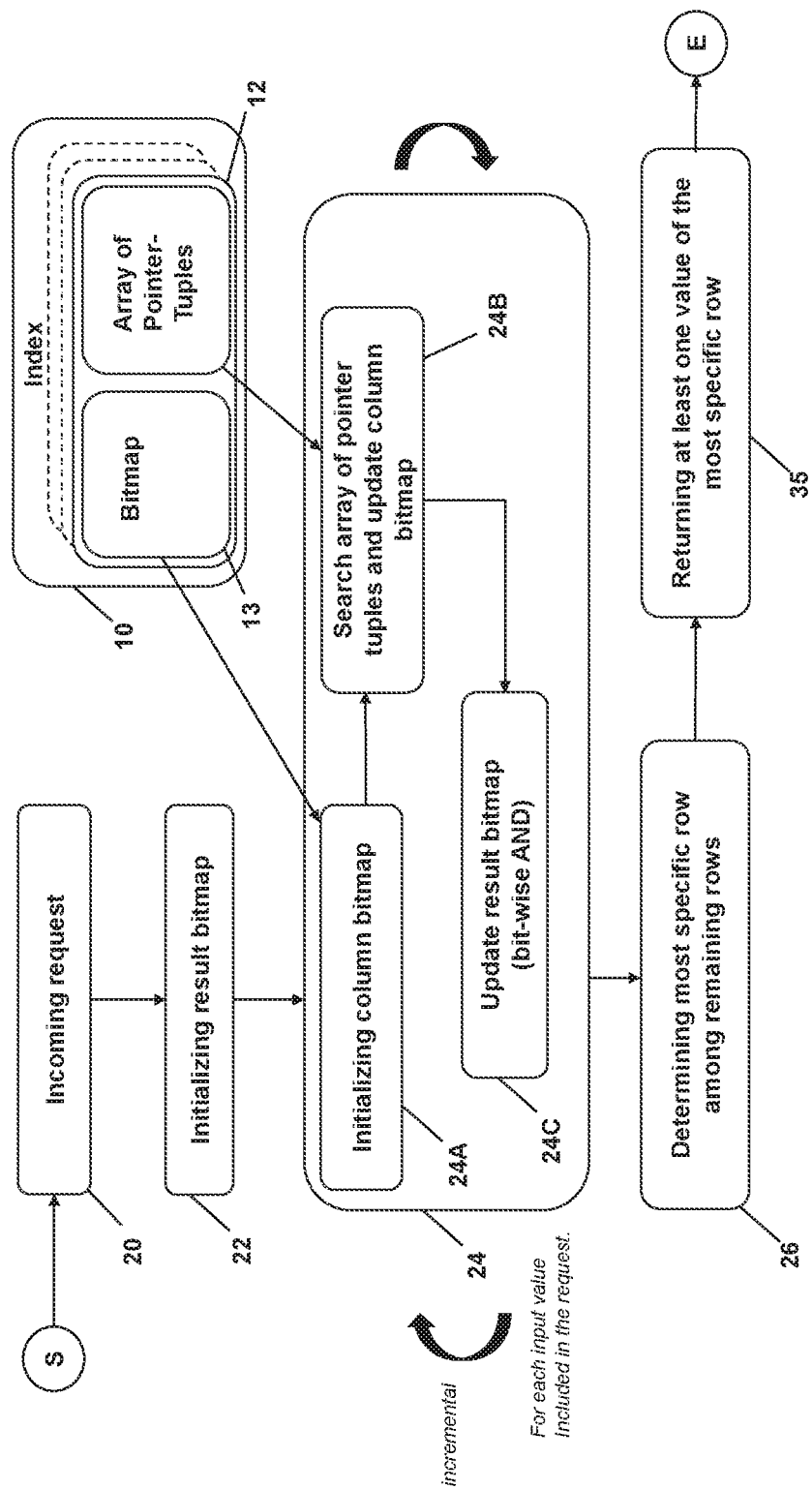
FIG. 6 is a flowchart of an exemplary request processing.

The operation of this request processing is visualized by the flowchart of FIG. 6. First, at 20, the computer system hosting the database 1 receives a request 9. In response to the request reception, the result bitmap 25 is initialized at 22. Then, the incremental process 24 is performed. Within column-wise iteration for each column and respective input value 6 indicated in the request 9, the column bitmap 23 is initialized at 24A, based on the respective no-value bitmap 13. Then, at 24B, the array of pointer tuples 12 is searched for all rows 3 of the current column 4 which include the respective input value 6, and the column bitmap 23 is updated accordingly. Then, at 24C, the column bitmap 23 and the current version of the result bitmap 25 are combined, e.g., by the logical bit-wise AND-operation, in order to obtain an updated result bitmap. After all columns 4 and respective input values 6 indicated in the request 9 have been processed in this incremental manner, the most specific of the remaining rows indicated in the final version of the result bitmap 25 is selected at 26. Finally, at 35, at least one value of the determined most specific row is returned. It is also possible that the result bitmap only contains '0' bits after the last iteration of the request processing. In this case, none of the rows of the database table fulfils the request and the return value therefore is a 'no-match' value.

In some embodiments, the bit assignment in the no-value bitmaps 13 is inverse (compared to the example of FIG. 4), i.e., bits set to the '0' denote all rows in the respective column without values (i.e., with wildcards), whereas bits set to '1' denote rows in the respective column with values (i.e., no wildcards). In these embodiments, also the bit assignment in the column bitmap 23 and in the result bitmap 25 is inverted, i.e., all bits set to '0' in the column bitmap 23 indicate rows 3 of the column considered which include the respective input value 6 and each '0' in the result bitmap 25 indicates that the row 3 associated with the respective bit has not yet been filtered out, i.e., is still a candidate row that potentially fulfils all the input values 6 included in the request 9. Consequently, in these embodiments, the column bitmap 23 and the result bitmap 25 are combined by a bit-wise logical OR operation.

Figure 7:
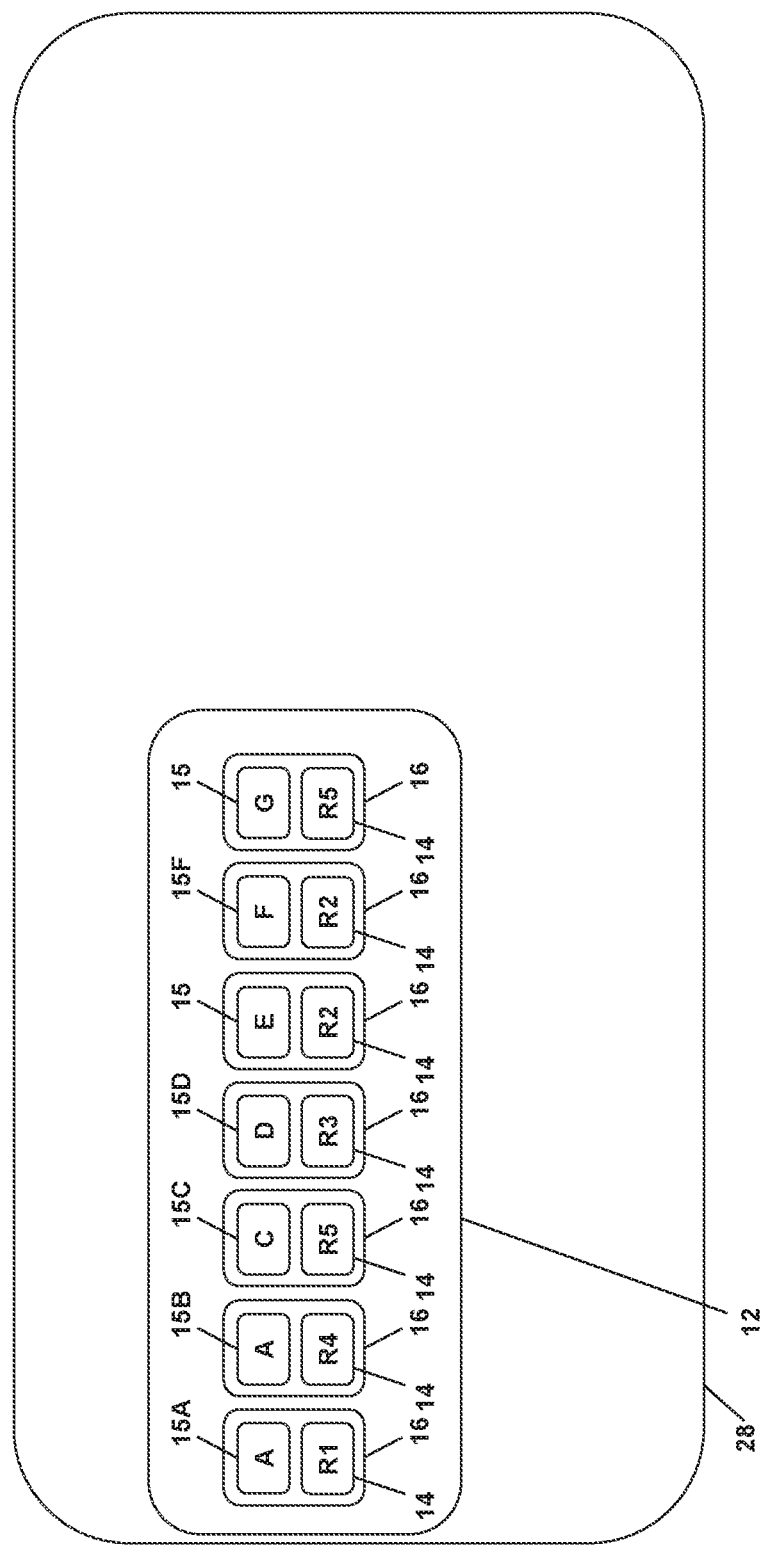
FIG. 7 illustrates an exemplary arrangement of an array of pointer tuples in memory.
Figure 8:
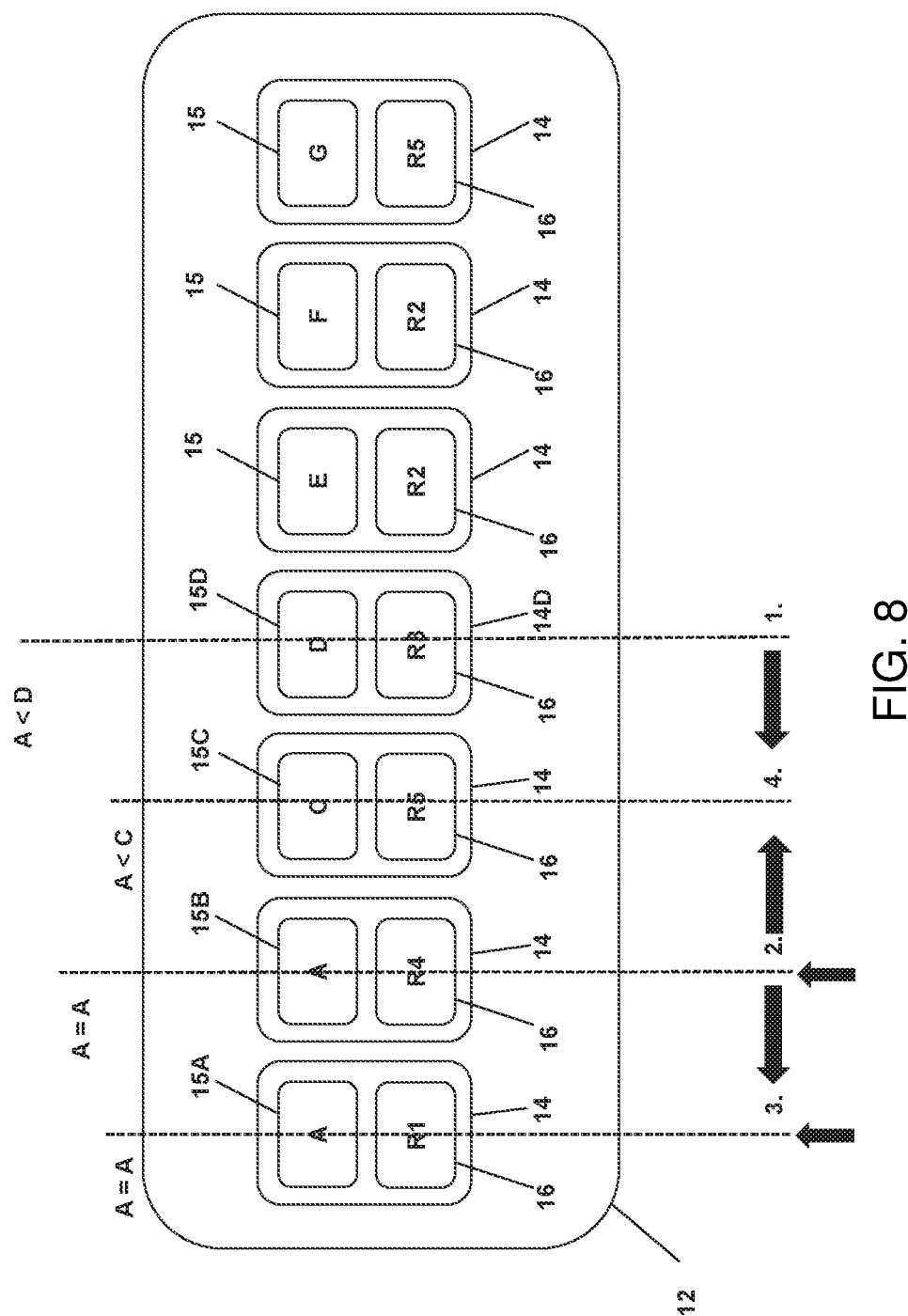
FIG. 8 illustrates a binary search over the array of pointer tuples.

In some embodiments, the incremental request processing (activity 24 in FIG. 6) and, in particular, searching the arrays of pointer tuples 12 for the presence of an input value (activity 24B in FIG. 6) includes a binary search within the pointer tuples 14 being contiguously stored in a memory of the computer system hosting the database 1 (FIGS. 7 and 8).

FIG. 7 shows a generic example of pointer tuples 14 which are stored contiguously at some location in the memory 28 of the computer system hosting the database 1. As visualized by the schematic representation of FIG. 7, each single pointer tuple 14 is arranged consecutively in the memory 28 within the array of pointer tuples 12, without gaps in between. This arrangement of the pointer tuples 14 in memory 28 facilitates direct access to the n-th pointer tuple (i.e., any arbitrary pointer tuple with the array 12) and thus facilitates a binary search for each column-wise iteration of the request 9.

FIG. 8 illustrates a generic binary search example for activity 24 B of FIG. 6. As mentioned above with reference to FIG. 4, the pointer tuples 14 within the array 12 are sorted by the values referenced by the first pointers 15 (sorting for the respective data types of the columns 4, e.g., alphabetical order for characters and strings), enabling the execution of a binary search over the pointer tuples 14. In accordance with the divide-and-conquer principle, the binary search algorithm enters the middle of the array 12 and examiners whether or not the value referenced by the first pointer 15D of the pointer tuple 14D located in the middle of array 12 corresponds to the input value 6. In the example of FIG. 8, the input value "A" is thus compared with the value "D" referenced by the first pointer 15D. If the input value 6 is lower than the value referenced by the considered first pointer 15, the same procedure is repeated in the upper half (left-hand half of array 12 in FIG. 8, i.e., with first pointer 15B). If the input value 6 is greater than the value referenced by the considered first pointer 15, the same procedure is repeated in the lower half of the array 12 (right-hand half of array 12 in FIG. 8, i.e., with first pointer 15F).

Figure 5:
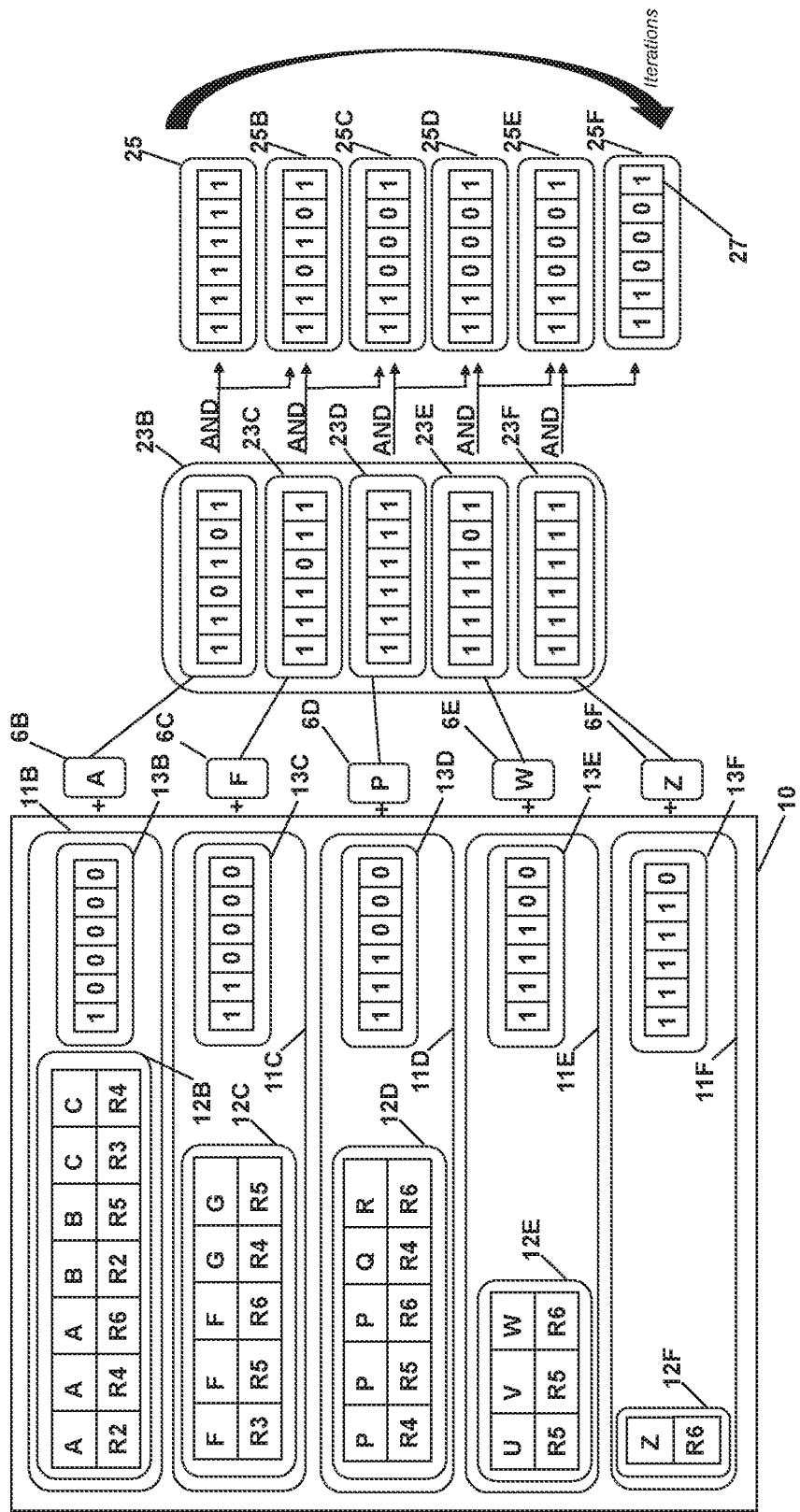
FIG. 5 give a generic example of request processing utilizing the index.

As shown by the examples of FIGS. 4 and 5, it is possible that multiple first pointers 15 reference the same value. In the example of FIGS. 7 and 8, first pointers 15A and 15B both reference the value "A". Hence, if the comparison between the input value 6 and the value referenced by the first pointer 15 currently considered at a particular stage of the binary search shows that both values are equal, the binary search is not yet terminated at that point. Rather, the binary search continues to determine potential further pointer tuples 14 and first pointers 15 which reference the input value 6 as well. Hence, after having found a match between the input value 6 and the value referenced by a first pointer 15, neighbour pointer tuples 14 located left and right of the currently considered pointer tuple (as far as they are present) are examined until a non-match between input value 6 and value referenced by the respective first pointer is determined or the algorithm arrives at a pointer tuple 14 already considered before. In the example of FIG. 8, the examination of the first pointer 15B (which is performed after the examination of the first pointer 15D) yields a match between the input value "A" and the value "A" reference by the first pointer 15B. In this situation, it is then determined whether or not the first pointers 15A and 15C reference value "A" as well. This is affirmative for the first pointer 15A and negative for the first pointer 15C. Hence, the binary search in the example of FIG. 8 terminates after value "A" has been found to be present in rows R1 and R4 of the column 4 considered. The first pointers 15D, 15B, 15A and 15C have been checked during the execution of the binary search.

The binary search employed by some embodiments has the computational complexity of O(log n) and is therefore generally more efficient as e.g., a linear search having a complexity of O(n). In some embodiments, the binary search is implemented in a recursive manner. In other embodiments, the binary search is implemented in an iterative manner.

In some embodiments, the computer system hosting the database 1 is arranged to generate the index 10 from the database table 2. The index 10 generated after the database table 2 has been established for the first time and then subsequently in response to a change of the database table 2, such as a change of one or more values in the cells 5, replacement of one or more values by a wildcard or vice versa, adding or deleting a row 3 or a column 4, etc.

In general, index generation includes establishing an index structure 11 for each column 4 of the database table 2 for which requests 9 can include input values 6. Corresponding to the structure of the index 10, this process mainly includes two activities, namely initialization and establishment of the no-value bitmaps 13 of each index structure 11 and establishing the array of pointer tuples 12 with the respective first pointer 15 and second pointer 16 in the pointer tuples 14.

Figure 9:
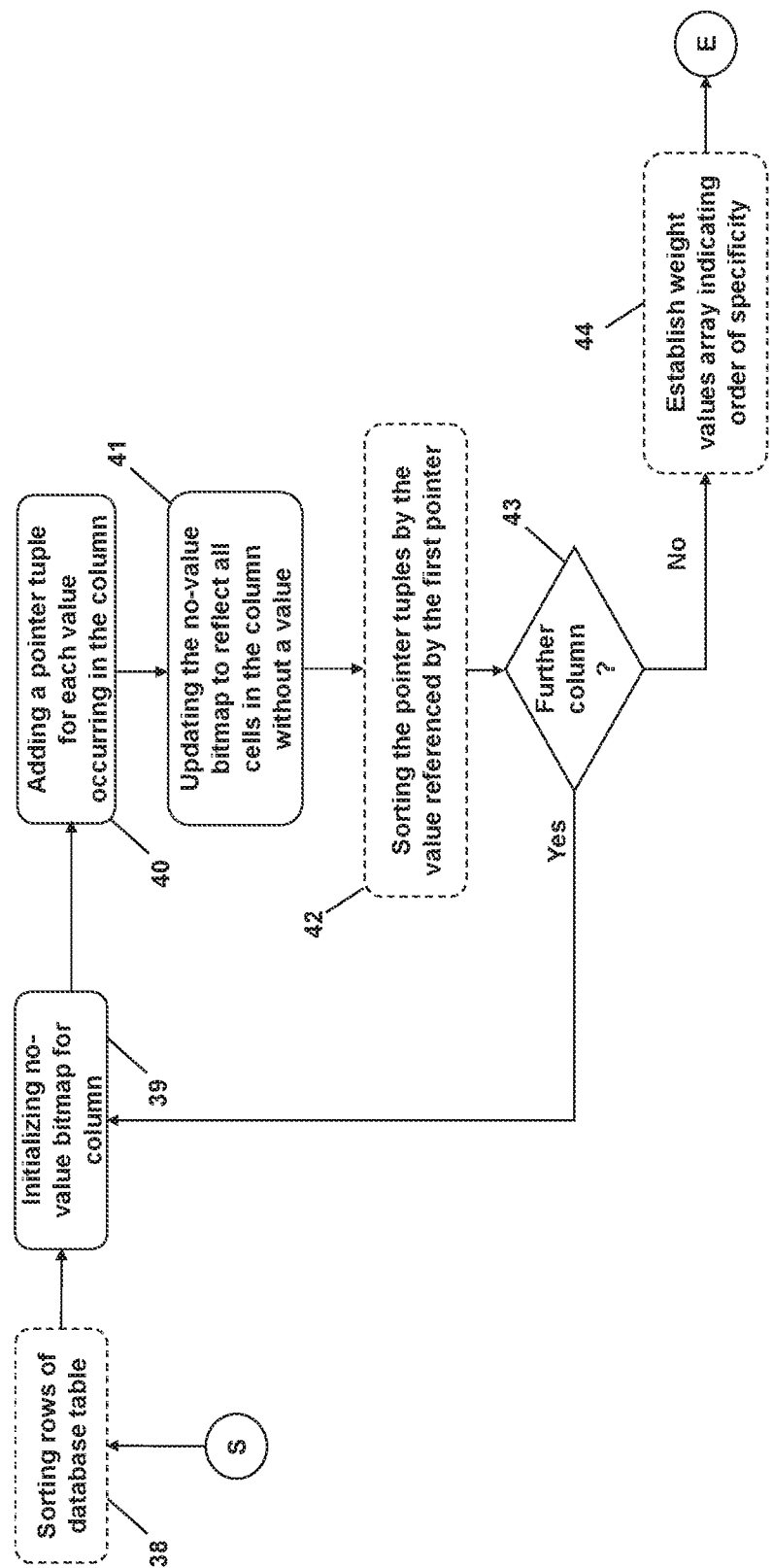
FIG. 9 illustrates an exemplary index generation.

An example of the index generation is shown by FIG. 9. Optionally, for embodiments with explicit or implicit order of specificity given by having the rows 3 of the database table 2 sorted in accordance with the order of specificity, the rows of the database table 2 are sorted at 38 (in case this has not been done beforehand). Generally, sorting the rows of the database table depends on a number of cells in each row 3 without values (i.e., with wildcards) and/or a specificity of the values in the cells 5 of the row 3. More specifically, in some embodiments, the rows 3 of the database table 2 are weighted. Each cell contributes to the weight of a row wherein a row without a value adds less weight than each cell with at least one value and, in some more specific embodiments, cells with a higher number of values/more specific values add less weight to the row than cells with a smaller number of values/less specific values. The sequence of rows with identical weight values is chosen in an arbitrary way. In some embodiments, indication of the order of specificity is given by a unique row order indicating the sorted rows, such as in the example of FIG. 2 (column 4A). This row order indication may function as a primary key of the database table 2.

The actual index generation then starts with the initialization of the first no-value bitmap 13 which may be referred to by a request 9 (e.g., bitmap 13B relating to column 4B, referring back to the example of FIG. 4). Bitmap initialization relates e.g., to allocating the required amount of memory e.g., in the main memory of the computer system hosting the database 1 and e.g., setting all bits in the bitmap 13 to '0' initially indicating no cell in the column 4 without value. Then, at 40, the array of pointer tuples 12 (e.g., array 12B of FIG. 4) is filled with the pointer tuples. One pointer tuple 14 is added to the array 12 for each value occurring in the rows 3 of the column 4 considered. At 41, the no-value bitmap 13 is updated in order to reflect all cells in the column without a value. For example, all bits corresponding to the cells without value are set to '1'. Optionally, at 42, the pointer tuples 14 in the array 12 are sorted by the values referenced by the respective first pointers 15. At that point, the index structure 11 for the first column (i.e., e.g., index structure 11B in the example of FIG. 4) is completely generated. At 43, it is checked whether or not the database table 2 has a further column for which an index structure 11 is to be established. If this is affirmative, activities 39 to 42 are repeated for this further column 4 (e.g., column 4C in the example of FIG. 4) in the same manner, until index structures 11 have been generated for all columns 4 of the database table which may be indicated in a request 9.

Optionally, in embodiments without sorted rows 3 (i.e., activity 38 was not performed), an array of weight values 7 explicitly indicating the order of specificity of the rows 3 is created at 44. In embodiments which allow several rows sharing the same weight value and several rows with identical weight correspond with the request 9, either one arbitrary row among the rows with the same weight is selected to be the most specific row, or a mechanism is present to allow only disjoint value combinations for the rows with the same weight with the effect that always only one row at a particular weight level corresponds with a request 9.

Figure 10:
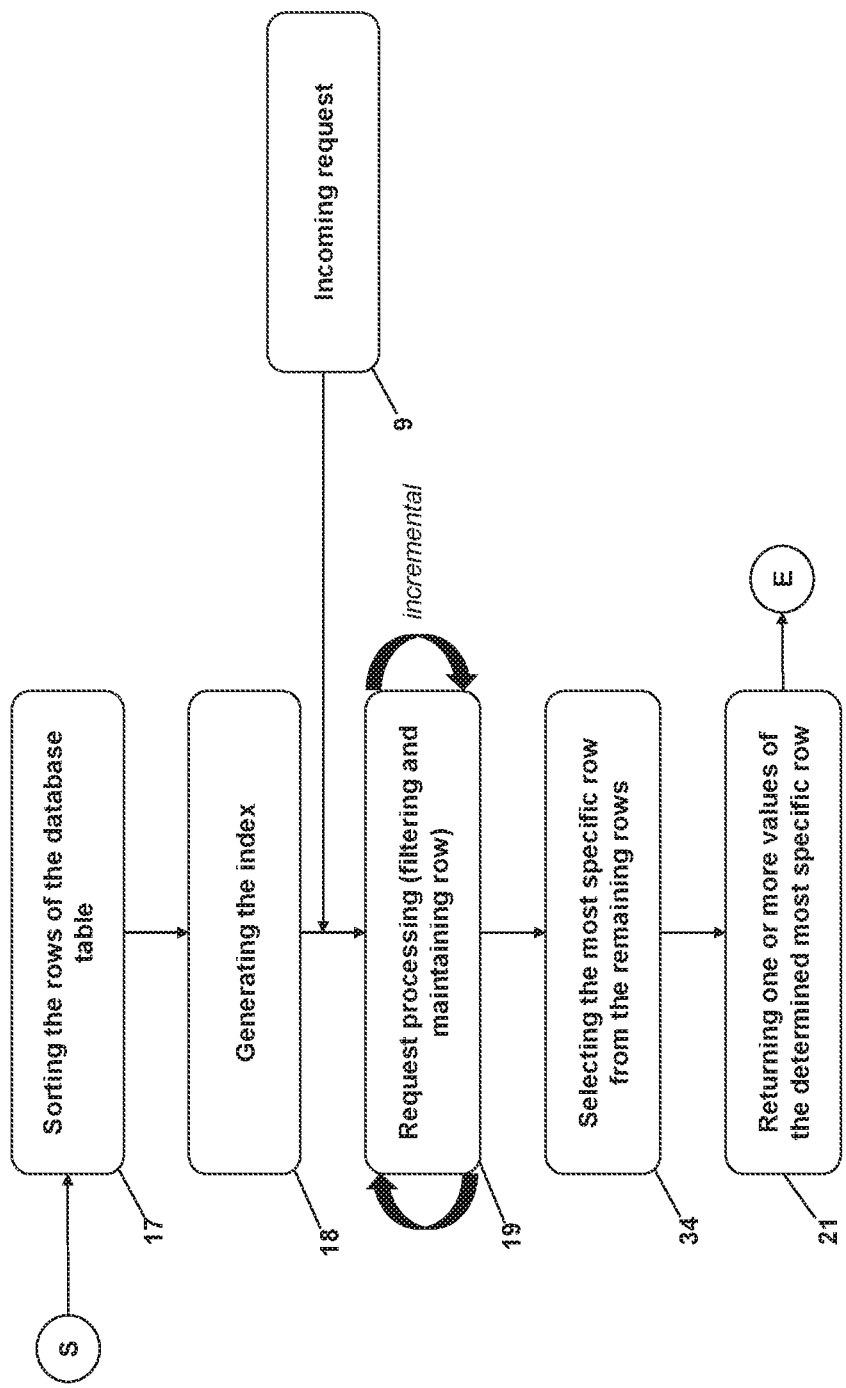
FIG. 10 is a high-level flowchart of an overall process including index generation and determination of the most specific row.

FIG. 10 presents an exemplary high-level flow of an overall process performed by the computer system hosting the database 1 with the at least one database table 2. At 17, the rows of the database table are sorting in order to constitute the order of specificity of the rows which is reflected in the index 10. At 18, the index 10 is generated (cf. example of FIG. 9). At a later point of time, a request 9 is received by the computer system, the request indicating at least one input value 6 for a column 4 of the database table 2. At 19, the request is processed on the basis of the index 10 in order to determine all rows 3 of the database table 2 which correspond to the input value(s) of the request 9, e.g., by activity 22 and incremental activity 24 shown in FIG. 6. At 34, the most specific row is selected from the remaining rows being output of activity 19, by utilizing the order of specificity reflected in the index 10, e.g., in the manner of activity 26 shown in FIG. 6. At 21, one or more values of the selected most specific row is returned.

Figure 11:
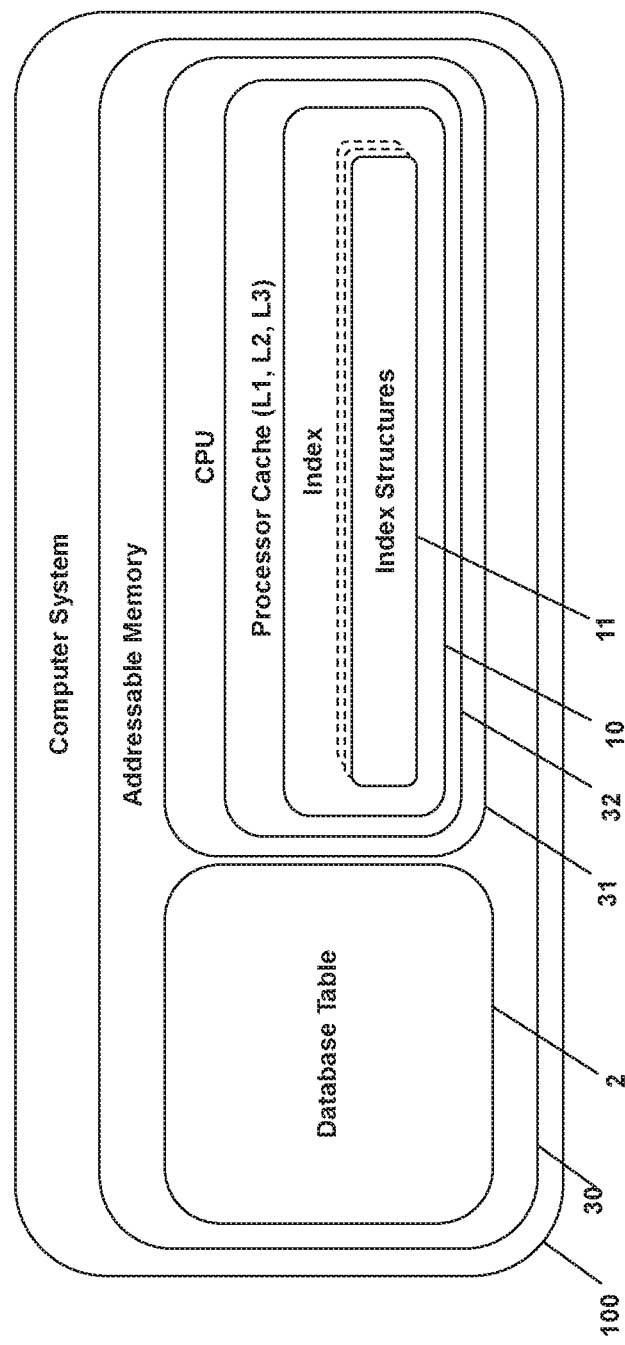
FIG. 11 schematically visualizes the maintenance of a database table and index in memories of a computer system.

The arrangement of the various data of the database 1 within the memory of the computer system 100 hosting the database 1 is depicted by FIG. 11. The computer system 100 has an addressable memory 30, which includes e.g., the main memory or operating memory (RAM) of the computer system 100. The computer system 100 maintains the database table 2 in the addressable memory 30, in some embodiments in the RAM. Request processing and determination of the most specific row are performed by central processing unit (CPU) 31. The CPU 31 includes at least one level of processor cache 32, in some embodiments at least three levels (L1 cache, L2, cache, L3) of different sizes and access speeds. The index 10 with the index structures 11 for the columns 4 of the database table 2 is also located in the addressable memory 30 of the computer system 100, in some embodiments in one of the at least one processor cache levels.

EXAMPLE

The index implementation presented herein is superior over other index mechanisms in terms of memory requirements/compactness, as will become from the following comparison with state-of-the-art index implementations. The comparison is based on a database table 2 with 1024 rows and five columns that can be subject to a request 9 with arbitrary values. The database table used for the comparison includes typical ratios of the number of no-value cells of 66%, the number of cells with more than one value of 10%, and an average size of the values. The same database table 2 was used for all implementations compared. The index implementation presented herein (e.g., index 10) was compared with two other known ways to index the database table rows. One of these ways is Red-Black Trees, which is a known associative data structure for indexing. The implementation is based on the the C++ std::map, provided with GCC 4.3.2 STL. The other of these ways is B-Trees, which is another associative data structure for indexing that is used to improve the data locality in a memory or on a disk. An aggregation factor of 256 items being a good compromise between efficiency and compactness was chosen.

The three approaches showed the following memory footprint (1 byte of accuracy) for the different indexes (all values are expressed in bytes):

|  | Index 10 | Red-Black Trees | B-Trees |
| --- | --- | --- | --- |
| Index structure column 1 | 13824 | 94720 | 51040 |
| Index structure column 2 | 13984 | 93504 | 50240 |
| Index structure column 3 | 11936 | 88320 | 48400 |
| Index structure column 4 | 13040 | 91776 | 50400 |
| Index structure column 5 | 13104 | 91968 | 50080 |
| Total | 65888 | 460288 | 250160 |

The size of the L1 cache of current state-of-the-art Intel CPU was 32 KB. Thus, each of the index structures of the index 10 as presented herein for a database table 2 with 1024 rows and more fits into the L1 cache of this size, while this is not the case for the Red-Black Trees and B-Trees implementations.

The size of a currently available L2 cache is 256 KB. Thus, all index structures together of the index 10 as presented herein for a database table 2 with 1024 rows and more fit in the L2 cache of this size, while this was not the case for the Red-Black Trees implementation. Although the B-Trees-based index for a database table 2 with 1024 rows fits into the L2 cache of this size, there was virtually no space left in the L2 cache for values of the database table 2 and the book-keeping data structures such as the column bitmap 23 and the result bitmap 25.

While the complete index meta-data and the complete database table 2 fit in the L3 cache (several MB, depending on the CPU model) for all three index implementations compared above, it is to be noted that the L3 cache was shared among CPU cores and was subject to synchronization overhead. Access to the L3 cache was therefore generally significantly slower than access to the L1 cache (generally 10 to 20 times slower) and slower than access to the L2 cache (generally 4 to 8 times slower). Thus, the memory compactness inherent in the index 10 presented herein allows to maintain the complete index or at least a significantly increased portion of the index (compared with the other two known index implementations mentioned above) in the L1 and/or L2 cache which constitutes a substantially increased performance of the request processing mechanism in order to determine the most specific row of the database table 2 corresponding with the request 9.

The index 10 and request processing mechanisms based on the index 10 presented herein may be applied to all sorts of different database and database-like systems, for example a router with a routing table.

FIG. 12 shows an exemplary routing table 33 of an IP router (i.e., a router at the network layer of the OSI reference model), but the index 10 is also applicable to any other or more specific types of routers such as logical routers and software routers (e.g., Enterprise Service Busses, ESB), hardware routers and backbone routers, high-end switches, DSL routers, WiFi routers, etc.

The routing table 33 is a simple example of a database table 2, having five rows and five columns. The columns, from left to right, define the destination address, the subnet mask, the next hop (e.g., the next router), the output network interface of the router as well as a metric indication. Destination address and subnet mask together form a network address (the subnet mask indicates the prefix bit range constituting the network address, while the remaining bits form the host address). Incoming IP packets to be routed to a destination form the requests 9. The router examines the destination IP address of an incoming IP packet and checks it against the routing table 33. In this regard, the router determines the most specific row of the routing table 33 with a network address (i.e., destination address in the first column overlaid with the subnet mask in the second column) encompassing the destination IP address of the incoming IP packet. An index 10 with at least one index structure 11 representing the destination network addresses (formed by the destination address of the first column overlaid with the subnet mask in the second column of routing table 33) and the request processing described in detail above are utilized to perform this determination of the most specific row corresponding to the destination IP address in an incoming request. For example, an IP packet with a destination address 192.168.1.23 is recognized as being directed to the network 192.168.1.0/24 (24=subnet mask 225.225.225.0), i.e., the fourth row is the most specific row of the routing table 33 corresponding with this request 9. On the other hand, for an IP packet with a destination number 123.123.123.123, the first row of the routing table 33 specifying the standard route will be determined to be the most specific row of the routing table 33 corresponding with this request 9. Hence, this IP packet will be routed to the next hop 192.168.1.1 via output network interface 192.168.1.2.

The index 10 and request processing mechanisms based on the index 10 presented herein are also applicable to other database or database-like systems, such as firewalls with filter tables (e.g., packet filters with or without stateful inspection, proxy filter, content filter), production engines, rules engines (e.g., repair repositories specifying repair procedures for any sorts of error symptoms of technical devices), streaming engines, transaction verification engines, etc.

Hence, the computer system 100 is, for example, a network node hosting a firewall, in which case the database table 2 is a filtering table, the request 9 is an incoming data packet and each row of the filtering table constitutes a filtering rule for allowing or preventing the incoming data packet to be forwarded towards a destination. Values of the incoming data packet (e.g., an IP packet carrying a TCP or UPD segment carrying an application layer packet such as an HTTP request) such as source and destination IP address, source and destination port addresses, and characteristics of the data packet, such as whether or not the data packet belongs to an existing connection, are checked against the filtering rules defined by the rows of the filtering table. The filtering table includes e.g., at least one destination column with possible destination addresses (such as IP addresses and/or port addresses), e.g., one or more source columns with possible source addresses (such as IP addresses and/or port addresses), e.g., one or more columns with values specifying characteristics of the incoming data packet (such as "established" referring to packets belonging to an established connection) and a column with Boolean values indicating whether the incoming data packet is to be forwarded or to be discarded. The most applicable (i.e., most specific) filtering rule (i.e., row) is determined on the basis of the input values 6 in the data packet and the corresponding value of the last-mentioned column (i.e., yes or no=accept or deny) is returned.

In case the computer system 100 is, for example, a rule engine, the database table 2 is rule table and each row of the rule table constitutes a rule to answer the request. The columns of the rule table define criteria of the rules. The input values 6 of the request defining particular rule criteria are checked against the rule table, the most specific rule complying with the input values 6 is determined and requested return values of the determined most specific row of the rule table is returned.

The database table index may facilitate the determination of the one most specific database table row fulfilling input parameters of a retrieval request. The database table index may have a particularly compact data representation, thus minimizing memory requirements. The database table index may specifically addresses the internal architecture and memory dimensioning of state-of-the-art computer systems and which is optimized to be maintained in a processor cache, thus facilitating high performance of the determination of the most specific database table row. The database table index may enable deterministic response processing.

Figure 13:
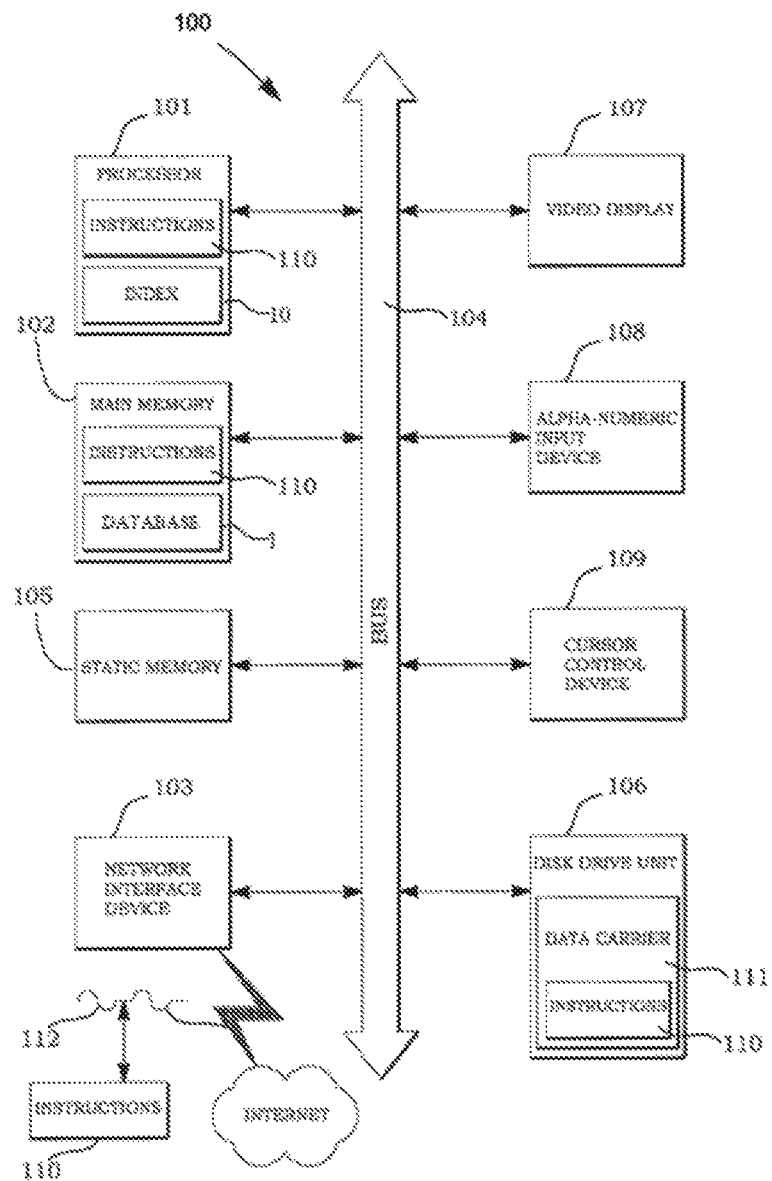
FIG. 13 is an exemplary schematic view of the internal architecture of a computer system implementing the database and/or a requesting client.

Finally, FIG. 13 is a diagrammatic representation of a computer system 100 which provides the functionality of the database 1 with the at least one database table 2. The database 1 may include a set of instructions to cause the computer system any of the methods and activities performed by the database table 1 as elaborated above. The computer system 100 includes a processor 101, a main memory 102 and a network interface device 103 which communicate with each other via a bus 104. The processor 101 includes at least one CPU cache holding at least a part of the index 10, as shown in FIG. 11 and in FIG. 13. The main memory 102 includes the database 1 (i.e., the executed software implementing the database system as well as the at least one database table 2) and, optionally parts of the database table 2 are also maintained within the CPU cache of the processor 101. Optionally, the computer system 100 may further include a static memory 105 and a disk-drive unit 106. A video display 107, an alpha-numeric input device 108 and a cursor control device 109 constitute a man-machine interface in order to operate the computer system 100. The network interface device 103 is wired and/or wireless interface which connects the database 1 to any number and sorts of client devices and applications issuing requests 9 to the database 1. The clients may reside on the Internet and/or any other network. The network interface device 103 utilizes either standard communication protocols such as the HTTP/TCP/IP protocol stack, IEEE 802.11 and/or proprietary communication protocols. A set of instructions (i.e., software) 110 embodying any one, or all, of the methodologies described above, resides completely, or at least partially, in or on a machine-readable medium, e.g., the main memory 102 and/or the processor 101 with the at least one CPU cache. Among others, the instructions may implement the functions of the database 1 to process incoming requests 9, to determine the most specific row 3 of the database table 2 corresponding to a request 9, as shown in FIG. 6, as well as the index generation of FIG. 9. A machine-readable medium on which the software 110 resides may also be a non-volatile data carrier 111 (e.g., a non-removable magnetic hard disk or an optical or magnetic removable disk) which is part of disk drive unit 106. The software 110 may further be transmitted or received as a propagated signal 112 via the Internet through the network interface device 103.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer system for determining one most specific row within a database table including a plurality of rows and a plurality of columns, the rows and columns of the database table forming cells, each cell including either at least one value or no value, the system comprising:
   a processor; and
   a memory including program code that, when executed by the processor, causes the computer system to:
   maintain an index for the database table, the index indicating an order of specificity of the rows of the database table and including a respective index structure for each column of the database table, the index structure including a respective array of pointer tuples for each value occurring in the respective column and a bitmap, each pointer tuple including a first pointer indicating one of the values occurring in the column and a second pointer indicating the row of the database table in which the value occurs, the bitmap indicating the cells within the respective column having no values using a first designation and indicating the cells within the respective column having values using a second designation that is distinct from the first designation;

receive a request indicating at least one column of the database table associated with a respective input value;

incrementally, for each column:

apply the bitmap of the index structure for the column to maintain all rows of the database table containing no values in the cell of the column considered, and apply the pointer tuples of the index structure for the column to filter all rows of the database table which do not include the respective input value;

select from the remaining rows, after the bitmap and the pointer tuples of the index structure are applied, the one most specific row that is highest in the order of specificity; and return the value of at least one cell of the one most specific row.

2. The computer system of claim 1 wherein the program code is further configured to cause the computer system to:

in response to receiving the request, initialize a result bitmap indicating the remaining rows; and wherein the program code causes the computer system to apply the pointer tuples and the bitmap of the index structure for each column indicated in the request by:

establishing a column bitmap that indicates all rows which fulfill the respective input value for the respective column; and updating the result bitmap by combining the result bitmap with the column bitmap.

3. The computer system of claim 2 wherein all rows that fulfill the respective input value are indicated by a '1' in the column bitmap, all remaining rows are indicated by '1' in the result bitmap and the result bitmap is combined with the column bitmap by a bitwise AND-Operation.

4. The computer system of claim 1 wherein the respective array of pointer tuples is stored contiguous in a memory of the computer system.

5. The computer system of claim 1 wherein the pointer tuples and the bitmap of the index structure for each column indicated in the request are applied by:

performing a binary search on the respective array of pointer tuples.

6. The computer system of claim 1 wherein the program code is further configured to cause the computer system to:

generate the index by:

initializing the bitmaps indicating the cells within the respective column having no values, adding a pointer tuple to the array of pointer tuples of the respective index structure for each value in the column, and updating the bitmap of the respective index structure to reflect all cells having no values.

7. The computer system of claim 6 wherein the program code further generates the index by:

sorting the pointer tuples of each index structure by the value pointed to by the first pointer.

8. The computer system of claim 1 wherein the indication of the order of specificity of the rows of the database table is realized by sorting the rows of the database table depending on a number of cells in each row without values and/or a specificity of the values in the cells of the row.

9. The computer system of claim 8 wherein the indication of the order of specificity is given by a unique row order indicating the sorted rows.

10. The computer system of claim 1 wherein the indication of the order of specificity is given by weight values included in the index of the database table.

11. The computer system of claim 1 wherein the computer system is a router, the database table is a routing table, each row of the routing table constitutes a routing rule for routing an incoming request towards a destination, and the routing table includes a destination column with possible destination values and a route column with corresponding values indicating a route towards the destination.

12. The computer system of claim 1 wherein the computer system is a firewall, the database table is a filtering table, the request is an incoming data packet, and each row of the filtering table constitutes a filtering rule for allowing or preventing the incoming data packet to be forwarded towards a destination, and the filtering table includes at least one destination column with possible destination addresses, at least one column with values specifying characteristics of the incoming data packet, and a column with Boolean values indicating whether the incoming data packet is to be forwarded or to be discarded.

13. The computer system of claim 1 wherein the computer system is a rule engine, the database table is rule table, each row of the rule table constitutes a rule to answer the request, and the columns of the rule table defining rule criteria.

14. The computer system of claim 1 further comprising:

a processor cache configured to persistently store the index after the value of at least one cell of the determined row has been returned to be available for processing further requests.

15. A method of determining one most specific row within a database table including a plurality of rows and a plurality of columns, the rows and columns of the database table forming cells, each cell including either at least one value or no value, the method comprising:

maintaining, by a computer system, an index for the database table, the index indicating an order of specificity of the rows of the database table and including a respective index structure for each column of the database table, the index structure including a respective array of pointer tuples for each value occurring in the respective column and a bitmap, each pointer tuple including a first pointer indicating one of the values occurring in the column and a second pointer indicating the row of the database table in which the value occurs, and the bitmap indicating the cells within the respective column having no values using a first designation and indicating the cells within the respective column having values using a second designation that is distinct from the first designation;

receiving, by the computer system, a request indicating at least one column of the database table associated with a respective input value;

incrementally, for each column, the computer system:

applying the bitmap of the index structure for the column to maintain all rows of the database table containing no values in the cell of the column considered, and applying the pointer tuples of the index structure for the column to filter all rows of the database table which do not include the respective input value;

selecting, by the computer system from the remaining rows after the bitmap and the pointer tuples of the index structure are applied, the one most specific row that is highest in the order of specificity; and returning, by the computer system, the value of at least one cell of the one most specific row.

16. The method of claim 15 further comprising:
in response to receiving the request, initializing a result bitmap indicating the remaining rows; and
wherein applying the pointer tuples and the bitmap of the index structure for each column indicated in the request comprises:
establishing a column bitmap that indicates all rows which fulfill the respective input value for the respective column; and
updating the result bitmap by combining the result bitmap with the column bitmap.

17. The method of claim 16 wherein all rows that fulfill the respective input value are indicated by a '1' in the column bitmap, all remaining rows are indicated by '1' in the result bitmap and the result bitmap is combined with the column bitmap by a bitwise AND-Operation.

18. The method of claim 15 wherein the respective array of pointer tuples is stored contiguous in a memory of the computer system.

19. The method of claim 15 wherein applying the pointer tuples and the bitmap of the index structure for each column indicated in the request comprises further comprises:
performing a binary search on the respective array of pointer tuples.

20. The method of claim 15 further comprising:
generating the index by:
initializing the bitmaps indicating the cells within the respective column having no values,
adding a pointer tuple to the array of pointer tuples of the respective index structure for each value in the column, and
updating the bitmap of the respective index structure to reflect all cells having no values.

21. The method of claim 20 wherein generating the index further comprises: sorting the pointer tuples of each index structure by the value pointed to by the first pointer.

22. The method of claim 15 wherein the indication of the order of specificity of the rows of the database table is realized by sorting the rows of the database table depending on a number of cells in each row without values and/or a specificity of the values in the cells of the row.

23. The method of claim 22 wherein the indication of the order of specificity is given by a unique row order indicating the sorted rows.

24. The method of claim 15 wherein the indication of the order specificity is given by weight values included in the index of the database table.

25. The method of claim 15 wherein the computer system is a router, the database table is a routing table, each row of the routing table constitutes a routing rule for routing an incoming request towards a destination, and the routing table includes a destination column with possible destination values and a route column with corresponding values indicating a route towards the destination.

26. The method of claim 15 wherein the computer system is a firewall, the database table is a filtering table, the request is an incoming data packet, and each row of the filtering table constitutes a filtering rule for allowing or preventing the incoming data packet to be forwarded towards a destination, and the filtering table includes at least one destination column with possible destination addresses, at least one column with values specifying characteristics of the incoming data packet, and a column with Boolean values indicating whether the incoming data packet is to be forwarded or to be discarded.

27. The method of claim 15 wherein the computer system is a rule engine, the database table is rule table, each row of the rule table constitutes a rule to answer the request, and the columns of the rule table defining rule criteria.

28. The method of claim 15 wherein the index is stored in a processor cache of the computer system and remains to be stored in the processor cache after the value of at least one cell of the determined row has been returned to be available for processing further requests.

29. A computer program product for determining one most specific row within a database table including a plurality of rows and a plurality of columns, the rows and columns of the database table forming cells, each cell including either at least one value or no value, the computer program product comprising:
a processor; and
a memory including a non-transitory computer-readable storage medium; and
program code that, when executed by the processor, causes the processor to:
maintain an index for the database table, the index indicating an order of specificity of the rows of the database table and including a respective index structure for each column of the database table, the index structure including a respective array of pointer tuples for each value occurring in the respective column and a bitmap, each pointer tuple including a first pointer indicating one of the values occurring in the column and a second pointer indicating the row of the database table in which the value occurs, and the bitmap indicating the cells within the respective column having no values using a first designation and indicating the cells within the respective column having values using a second designation that is distinct from the first designation;
receive a request indicating at least one column of the database table associated with a respective input value;
incrementally, for each column:
apply the bitmap of the index structure for the column to maintain all rows of the database table containing no values in the cell of the column considered, and
apply the pointer tuples of the index structure for the column to filter all rows of the database table which do not include the respective input value;
select from the remaining rows, after the bitmap and the pointer tuples of the index structure are applied, the one most specific row that is highest in the order of specificity; and
return the value of at least one cell of the one most specific row.

* * * * *